(12) United States Patent
Voth et al.

(10) Patent No.: US 11,724,595 B2
(45) Date of Patent: Aug. 15, 2023

(54) HARVESTER POWER TAKEOFF CLUTCH SYSTEM INCLUDING DETACHABLE EXTENSION MODULE

(71) Applicant: Deere & Company, Moline, IL (US)

(72) Inventors: Danny G. Voth, Liberty, KS (US); Cecil H. Wise, Jr., Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 132 days.

(21) Appl. No.: 17/492,155

(22) Filed: Oct. 1, 2021

(65) Prior Publication Data

US 2023/0104060 A1   Apr. 6, 2023

(51) Int. Cl.
*B60K 17/28* (2006.01)
*A01D 69/00* (2006.01)
*F16D 13/52* (2006.01)

(52) U.S. Cl.
CPC ............ *B60K 17/28* (2013.01); *A01D 69/002* (2013.01); *F16D 13/52* (2013.01); *B60Y 2200/222* (2013.01); *F16D 2500/10437* (2013.01)

(58) Field of Classification Search
None
See application file for complete search history.

(56) References Cited

U.S. PATENT DOCUMENTS

| | | | |
|---|---|---|---|
| 6,450,309 B1 * | 9/2002 | Hirai | B60K 23/02 192/85.63 |
| 9,597,958 B2 * | 3/2017 | Reinhart | B60K 17/28 |

FOREIGN PATENT DOCUMENTS

| | | | | |
|---|---|---|---|---|
| CA | 2837072 C | * | 12/2020 | B60K 17/28 |
| DE | 102011085255 A1 | | 5/2013 | |
| DE | 102016114403 A1 | | 2/2017 | |
| EP | 3763972 A1 | * | 1/2021 | B60K 17/34 |
| KR | 200233771 Y1 | * | 9/2001 | |

OTHER PUBLICATIONS

German Search Report issued in application No. DE102022207648.6 dated Mar. 2, 2023 (12 pages).

(Continued)

*Primary Examiner* — Faye M Fleming
(74) *Attorney, Agent, or Firm* — Klintworth & Rozenblat IP LLP

(57) ABSTRACT

A harvester power takeoff (PTO) clutch system includes a detachable PTO extension module and transmission gearbox housing, which has a clutch compartment and a clutch service port through which the clutch compartment can be accessed. A PTO clutch is disposed in the clutch compartment, while a clutch shaft extends from the PTO clutch and projects from the clutch compartment through the clutch service port. The detachable PTO extension module includes, in turn: a PTO housing extension mounted to the transmission gearbox housing; a PTO shaft rotatably coupled to the PTO clutch and projecting from the PTO housing extension in a direction opposite the transmission gearbox housing; an inner extension bearing disposed in the PTO housing extension and rotatably supporting the clutch shaft; and an outer extension bearing further disposed in the PTO housing extension and rotatably supporting the PTO shaft.

20 Claims, 9 Drawing Sheets

(56) References Cited

OTHER PUBLICATIONS

John Deere CS690 Cotton Stripper Maintenance and Cleaning Guide, 2014. (20 pages).
John Deere PTO Quill, AR38168, https://www.tractorpartsasap.com/pto-quill-used-john-deere-ar38168-498506.html, undated, admitted prior art. (1 page).

* cited by examiner

HARVESTER POWER TAKEOFF CLUTCH SYSTEM INCLUDING DETACHABLE EXTENSION MODULE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power takeoff (PTO) clutch systems for harvesters, such as cotton pickers and strippers, including detachable PTO extension modules facilitating clutch servicing and providing other benefits.

BACKGROUND OF THE DISCLOSURE

Self-propelled agricultural harvesting machines or "harvesters" have greatly increased the efficiency with which many crops are harvested, processed (e.g., threshed and cleaned), and collected for distribution to consumers. Combine harvesters (also referred to as "agricultural combines"), for example, are commonly utilized to harvest corn, canola, soybeans, wheat, oats, sunflowers, and similar crops. Other, more specialized harvesters are utilized to harvest other crop types, including sugarcane and cotton. Regardless of its particular form, a harvester is commonly equipped with a power takeoff (PTO) system, which diverts some fraction of the power output generated by an engine to mechanically power other crop processing devices onboard the harvester or contained in a header platform attached to the harvester. Examples of such crop processing devices include crop conveyance mechanisms, such as conveyor belts and transfer augers located within the interchangeable headers or feederhouse of a combine harvester. As a more specific example, in the case of a cotton harvester (e.g., a cotton picker or stripper), a PTO system is often utilized to mechanically power one or more cotton fans, which generate airflow to help convey lint and seed cotton through the cotton harvester and perform other functions.

SUMMARY OF THE DISCLOSURE

Harvester power takeoff (PTO) clutch systems are provided including detachable PTO extension modules. In a first example embodiment, a harvester PTO clutch system includes a detachable PTO extension module and a transmission gearbox housing, which has a clutch compartment and a clutch service port through which the clutch compartment can be accessed. A PTO clutch is disposed in the clutch compartment, while a clutch shaft extends from the PTO clutch and projects from the clutch compartment through the clutch service port. The detachable PTO extension module includes, in turn: a PTO housing extension mounted to the transmission gearbox housing; a PTO shaft rotatably coupled to the PTO clutch and projecting from the PTO housing extension in a direction opposite the transmission gearbox housing; an inner extension bearing disposed in the PTO housing extension and rotatably supporting the clutch shaft; and an outer extension bearing further disposed in the PTO housing extension and rotatably supporting the PTO shaft. The clutch service port is at least partly uncovered when the detachable PTO extension module is removed from the transmission gearbox housing to facilitate manual access to the PTO clutch.

In a further embodiment, the harvester PTO clutch system is utilized onboard a cotton harvester having a cotton fan and a drive belt. The harvester PTO clutch system includes a PTO housing extension, a PTO clutch, and transmission gearbox housing containing a clutch compartment. The PTO clutch is disposed within the clutch compartment and manually accessible through a clutch service port formed in the transmission gearbox housing. The PTO housing extension is mounted to the transmission gearbox housing and covers the clutch service port to enclose the clutch compartment, while a clutch shaft extends from the PTO clutch and into the PTO housing extension. A PTO shaft includes (i) an outer end portion projecting from the PTO housing extension in a direction opposite the clutch compartment, and (ii) an inner end portion terminating within the PTO housing extension and joined to the clutch shaft in a rotationally-fixed relationship. A pulley wheel is mounted to the outer end portion of the PTO shaft for corotation with the PTO shaft and with the clutch shaft to drive the cotton fan through the drive belt when the PTO clutch is engaged.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
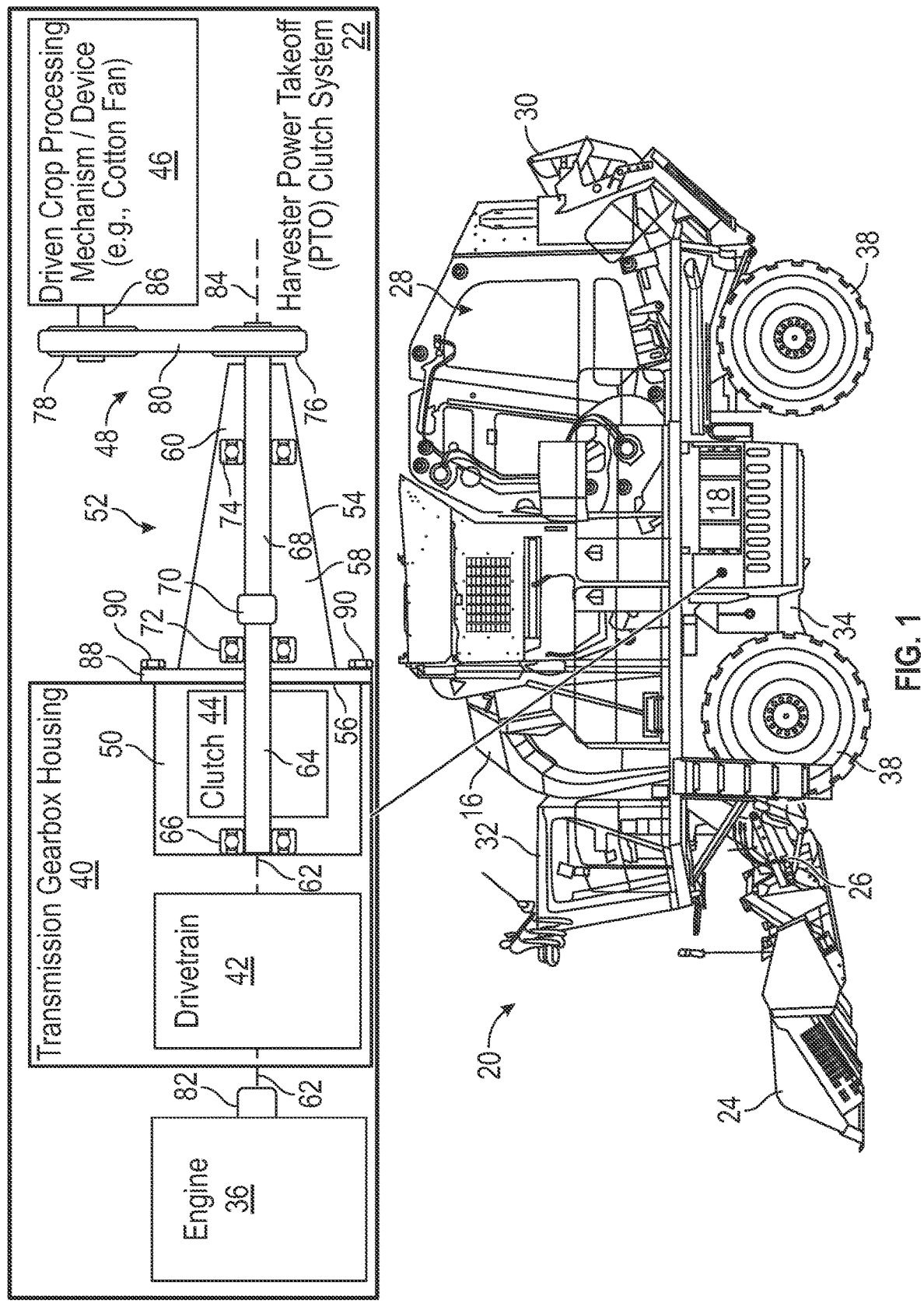
FIG. 1 schematically illustrates a self-propelled agricultural harvesting machine (here, a cotton harvester) equipped with a power takeoff (PTO) clutch system, as presented in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

OVERVIEW

As previously indicated, agricultural harvesters are commonly equipped with power takeoff (PTO) systems for mechanically driving devices utilized to process harvested crop plants and perform other functions. While the design and construction of such PTO systems varies depending upon application and harvester type, such PTO systems often enable an operator to control whether a given crop processing device is presently powered through the PTO system utilizing a PTO clutch and clutch shaft arrangement. Harvester PTO systems containing PTO clutch and clutch shaft arrangements of this type are referred to herein as "harvester PTO clutch systems." Harvester PTO clutch systems, as traditionally designed and implemented, are capable of providing reliable operation over extended periods of usage, providing that such systems are properly maintained. However, in certain circumstances, unplanned service and potential replacement of components with a harvester PTO clutch system, including the PTO clutch itself, may be warranted. Conventionally, extensive disassembly of componentry contained in the PTO clutch systems, particularly a relatively large and geometrically complex transmission gearbox housing, is required to access the PTO clutch and surrounding components for diagnostic, service, and potential replacement purposes. For this reason, relatively lengthy time periods (e.g., upwards of 40 hours of manual labor) are often required to service a PTO clutch and perform similar service tasks in the context of conventional PTO clutch systems. This not only results in undesirably high service costs, but also in prolonged periods of harvester downtime.

There thus exists an ongoing industrial demand for harvester PTO clutch systems streamlining access to the PTO clutch and surrounding components for inspection, maintenance, and/or replacement purposes (encompassed herein by the term "service"). In satisfaction of this demand, the following discloses harvester PTO clutch systems enabling relatively rapid service access to a PTO clutch through the removal of a unique, modular PTO shaft and housing assembly (herein, a "detachable PTO extension module"). In addition to streamlining clutch service access, embodiments of the harvester PTO clutch system provide other notable benefits, as well. Embodiments of the presently-disclosed harvester PTO clutch system are amenable to cost effective manufacture due to, for example, the ability to readily fabricate certain housing components contained within the PTO clutch system, such as the PTO extension housing included in the detachable PTO extension module, by casting and machining. Additionally, embodiments of the harvester PTO clutch system are generally characterized by structurally robust designs providing disturbance resistant, wide stance bearing support of the clutch shaft and PTO shaft within the PTO extension module. As a still further benefit, the harvester PTO clutch system may be fabricated to have relatively compact designs, which are well-suited for accommodating spatial constraint onboard cotton pickers and other smaller harvester platforms.

In various implementations, the detachable PTO extension module includes a longitudinally-elongated PTO extension housing, which may be bolted or otherwise attached to the transmission gearbox housing. A clutch compartment is provided in the transmission gearbox housing and includes a clutch service port; that is, an opening formed through a wall of the transmission gearbox housing and structurally configured (sized and shaped) to allow access to, and the potential removal of, the PTO clutch during servicing. The clutch service port is covered or enclosed by an inner end portion of the PTO housing extension when attached to the transmission gearbox housing. By virtue of this structural arrangement, manual access to the PTO clutch through the clutch service port is provided or otherwise facilitated when the detachable PTO extension module is removed from the transmission gearbox housing. Moreover, the interface at which the PTO extension housing is attached to the transmission gearbox housing is manually accessible without disassembly of the PTO clutch system such that detachable PTO extension module can be removed with a minimal number of steps; e.g., in embodiments, the PTO extension module may be detached by first removing a drive belt included in a drive belt arrangement and subsequently removing a bolt ring joining a peripheral flange of the PTO extension housing to the transmission gearbox housing. Service access to the PTO clutch, as well as surrounding structural components, is thereby streamlined relative to existing harvester PTO clutch systems to greatly reduce service time requirements and harvester downtime when servicing the PTO clutch and other components within the harvester PTO clutch system.

Embodiments of the detachable PTO extension module further include a PTO shaft and at least two rolling element bearings. A first rolling element bearing (herein, the "outer extension bearing") is situated within an outer end portion of the PTO housing extension; that is, the end portion of the PTO housing extension located furthest from the clutch compartment. This rolling element bearing rotatably supports the PTO shaft at a location near the outer terminal end of the PTO shaft. Comparatively, the second rolling element bearing (herein, the "inner extension bearing") is located within the inner end portion of the PTO housing extension and rotatably supports an outer end of the clutch shaft, which projects from the clutch compartment and which is received into the PTO housing extension. In at least some implementations, the PTO shaft, the PTO housing extension, and more broadly the detachable PTO extension module are dimensioned such that a relatively broad longitudinal spacing or "wide stance" is provided between the inner and outer extension bearings. To this end, in embodiments, the extension bearing spacing may exceed the length of the clutch shaft and/or an average depth of the clutch compartment, as taken along the rotational axis of the PTO shaft. Generally, such a wide bearing stance decreases the likelihood of rotational imbalances and other problematic modes (informally "shaft wobble") developing over time within the detachable PTO extension module. Additionally, the clutch shaft and PTO shaft may be well-supported at a sliding shaft-to-shaft interface, which enables the clutch shaft and PTO shaft to readily decouple in conjunction with detachment of the PTO extension module. The detachable PTO extension module may also be designed such that the inner and outer extension bearings are readily accessible with relatively few disassembly steps to further facilitate inspection and maintenance of PTO clutch system.

The PTO housing extension can be fabricated to have a range of form factors and constructions in embodiments. In embodiments, the PTO housing extension includes, as a principal structural feature, an outer circumferential or peripheral sidewall having a generally conical geometry (herein, an "outer conical sidewall"). In this case, the outer conical sidewall of the PTO housing extension may be shaped and dimension to taper downwardly in both inner and outer diameters when moving from the inner end portion of the PTO housing extension toward the outer end portion thereof. Imparting the outer sidewall of the PTO housing extension with such a conical geometry (or, stated more broadly, imparting the PTO housing extension with a generally frustoconical shape) enhances the overall structural integrity of the PTO housing extension, while providing the PTO housing extension with a relatively broad mounting base or interface at the housing extension's inner end portion. This, in turn, may enable mounting of the PTO housing extension to the transmission gearbox housing in a structurally-secure, cantilevered manner; e.g., such that little, if any structural support is provided adjacent the middle and outer end portions of the PTO housing extension, despite loading of the outer end of the PTO shaft through, for example, a drive belt arrangement. Due at least in part to the conical design of the PTO housing extension and the open cavity design of the clutch compartment, fabrication of the PTO housing extension and the transmission gearbox housing may be simplified to reduce manufacturing costs. Such attributes may also enable the envelope of the harvester PTO clutch system to be minimized, when so desired, to accommodate any existing spatial (envelope) constraints of the harvester onboard which the PTO clutch system is deployed.

As should be appreciated from the statements above, and as discussed more fully below, embodiments of the presently-disclosed harvester PTO clutch system provide multiple benefits over existing harvester PTO clutch systems. These benefits include, but are not limited to, streamlined servicing of the PTO clutch and surrounding structural components contained within the PTO clutch system. An example harvester PTO clutch system will now be discussed in greater detail in connection with FIGS. 1-10. While the example harvester PTO clutch system is principally described below in the context of a particular type of self-propelled agricultural harvest machine (namely, a cotton picker), embodiments of the harvester PTO clutch system can be utilized in conjunction with a wide range of harvesters and agricultural machines, including other types of cotton harvesters (e.g., cotton strippers), combine harvesters, and sugarcane harvesters. Accordingly, the following description should be understood as merely providing a non-limiting example context in which embodiments of the present disclosure may be better understood.

Example Harvester PTO Clutch System Including a Detachable PTO Extension Module

Referring initially to FIG. 1, a self-propelled agricultural machine or "harvester" (here, a cotton picker 20) is equipped with a harvester PTO clutch system 22, as illustrated in accordance with an example embodiment of the present disclosure. In addition to the harvester PTO clutch system 22, the example cotton picker 20 includes a cotton header or harvesting platform 24, which is adapted to intake multiple rows of cotton plants as the cotton picker 20 travels across a field. The picking units are connected to conveyance assembly or feederhouse 26, which directs cotton lint and seed into the main body 28 of the cotton picker 20 for processing. An air conveyance system, including a vertically-extending duct 16 and the below-described cotton fan, lifts and transports the harvested cotton into the body 28 of the cotton picker 20. Within the cotton picker body 28, the cotton is further processed and ultimately collected into a bale (e.g., by an accumulator feeding a round module builder), which is then ejected through a rear gate 30 for subsequent retrieval. In other embodiments, the harvested cotton may be collected into a basket (e.g., via a basket module utilized in place of the round module builder) and/or various aspects of the cotton picker 20 may differ relative to the illustrated example, providing that the cotton picker 20 is beneficially equipped with the below-described harvester PTO clutch system 22. Finally, in embodiments in which the cotton picker 20 is manually operated, a cabin 32 is located atop at a leading portion of the chassis 34 to enclose an operating station including a seat, controls, display devices, and similar components utilized to pilot the cotton picker 20.

The cotton picker 20 is equipped with an engine 36, such as a heavy duty internal combustion engine, which is housed within an engine compartment 18. During operation, the engine 36 powers rotation of the ground-engaging wheels 38 of the cotton picker 20 through a driveline arrangement. In this regard, and as schematically indicated in an upper portion of FIG. 1, the cotton picker 20 may include a transmission gearbox housing 40 containing a drivetrain 42. The drivetrain 42 mechanically links an output shaft 82 of the engine 36 to a mechanical input of the drivetrain 42, such as an engine shaft connection flange 108 shown in FIGS. 2 and 3 (described below). The harvester PTO clutch system 22 also contains a PTO clutch 44, an associated clutch shaft 64, a PTO shaft 68, and at least one mechanically-driven crop processing mechanism or device 46. This crop processing device 46 may include, or assume the form of, at least one cotton fan in the case of the illustrated cotton picker 20. Airflow from the cotton fan may be utilized to convey harvested cotton through the duct 16 and into the body 28 of the cotton picker 20 for further processing, as previously described. Additionally or alternatively, the cotton fan may provide other functions depending upon system design including, for example, generating forced airflow utilized for convective cooling purposes.

In embodiments of the harvester PTO clutch system 22, the PTO clutch 44 may assume the form of a hydraulically-actuated clutch pack containing a hydraulic piston, one or more release springs, and a number of clutch discs disposed in a stacked arrangement. Regardless of its particular form, the PTO clutch 44 is housed within an open clutch cavity or compartment 50, which is provided in the transmission gearbox housing 40. The clutch compartment 50 includes a principal access opening or "clutch service port" 56 formed through an outer wall of the gearbox housing 40. As indicated in FIG. 1, the clutch service port 56 opens toward the detachable PTO extension module 52 and is structurally configured (that is, sized and shaped) to allow physical access to the PTO clutch 44 during servicing. In many instances, the PTO clutch 44 may be serviced while the clutch 44 remains situated within the clutch compartment 50 following removal of the below-described detachable PTO extension module 52. This stated, the clutch service port 56 is beneficially dimensioned to enable the removal of the PTO clutch 44 from the clutch compartment 50, as needed or desired, for inspection, service, and potential replacement purposes.

Detachable PTO extension module 52 is removably mounted or affixed to the transmission gearbox housing 40 and projects toward the drive belt arrangement 48. The detachable PTO extension module 52 includes, among other components, a longitudinally-elongated housing piece or assembly referred to herein as a "PTO housing extension 54." The PTO housing extension 54 may be constructed from any number of pieces, but is advantageously produced (e.g., cast and machined) as a single, unitary structure in embodiments of the detachable PTO extension module 52. The PTO housing extension 54 includes an inner end portion 58 and an outer end portion 60; the terms "inner" and "outer," as utilized in this context, defined in view of the relative proximity of the end portions 58, 60 to the clutch compartment 50 of the transmission gearbox housing 40. For example, in this regard, the inner end portion 58 of the PTO housing extension 54 is located closest and longitudinally-adjacent the clutch compartment 50 when the detachable PTO extension module 52 is attached to the transmission gearbox housing 40, as taken along the rotational axis of the PTO shaft 68 represented by a dashed line 84 in FIG. 1 (also representative of rotational axis of the clutch shaft 64 when the shafts 64, 68 corotate about a common axis). The inner end portion 58 of the PTO housing extension 54 is bolted or otherwise affixed to the transmission gearbox housing 40 in a manner covering the clutch service port 56. By virtue of this structural arrangement, streamlined service access to the PTO clutch 44 through the clutch service port 56 is provided following removal of the PTO housing extension 54 and, more generally, the detachable PTO extension module 52 from the transmission gearbox housing 40, as discussed below in connection with FIG. 9.

As denoted in FIG. 1 by dashed lines 62, the output shaft of the engine 36 is mechanically linked to an input of the drivetrain 42; and an output of the drivetrain 42 is, in turn, mechanically linked to the clutch shaft 64. The clutch shaft 64 extends from the PTO clutch 44, projects from the transmission gearbox housing 40 through the clutch service port 56, and is received into the inner end portion 58 of the detachable PTO housing extension 54. The inner end of the clutch shaft 64 (that is, the end of the clutch shaft 64 furthest the detachable PTO extension module 52) is supported by a first rolling element bearing 66 within the clutch compartment 50 of the transmission gearbox housing 40. This rolling element bearing is referred to herein as the "gearbox housing bearing 66" and may assume the form of, for example, a ball or roller bearing. Opposite the inner end of the clutch shaft 64, the outer end portion of the clutch shaft 64 is rotationally coupled to the PTO shaft 68 for corotation about the rotational axis 84. The clutch shaft 64 and PTO shaft 68 can be rotationally coupled, directly or indirectly, in any suitable manner; e.g., as indicated in FIG. 1, the shafts 64, 68 may be rotationally coupled utilizing a shaft-to-shaft adapter or coupler piece 70 in embodiments. An example implementation of the shaft-to-shaft coupler piece 70 is further described below in connection with FIGS. 2-10; however, the coupler piece 70 may generally assume any structural form suitable for placing the clutch shaft 64 and the PTO shaft 68 in a rotationally-fixed relationship such that shafts 64, 68 corotate about the rotational axis 84 when the PTO clutch 44 is engaged.

Two rolling element bearings 72, 74 are further disposed within the detachable PTO housing extension 54. The bearings 72, 74 include (i) an inner extension bearing 72 located closer to the clutch compartment 50 and PTO clutch 44, as taken along a rotational axis 84 of the PTO shaft 68; and (ii) an outer extension bearing 72 located further from the clutch compartment 50 and PTO clutch 44, as taken along the rotational axis 84. The inner extension bearing 72 may be disposed within the inner end portion 58 of the detachable PTO housing extension 54 and configured to rotatably support the clutch shaft 64. Comparatively, the outer extension bearing 74 is located within the outer end portion 60 of the detachable PTO housing extension 54 and rotatably supports the PTO shaft 68. The rolling element bearings 72, 74 may be single row ball bearings, as schematically illustrated in FIG. 1; but may assume other forms, such as roller bearings (tapered or non-tapered) and duplex (multi-row) ball bearings, in further embodiments.

The PTO shaft 68 projects from the outer end portion 60 of the detachable PTO housing extension 54 in a direction opposite the transmission gearbox housing 40, with an output pulley wheel 76 joined to the outer terminal end of the PTO shaft 68 in a rotationally-fixed relationship. The output pulley wheel 76 is, in turn, joined to an input pulley wheel 78 by a drive belt 80 such that the pulley wheels 76, 78 and the drive belt 80 form the above-mentioned drive belt arrangement 48. The input pulley wheel 78 is joined to a shaft 86 or other rotary input of the driven processing device 46, which may assume the form of a cotton fan in the case of the example cotton picker 20, as noted above. In other instances, other mechanically-driven devices of the cotton picker 20 may also be driven through the PTO clutch system 22 in addition to or in lieu of the illustrated crop processing device 46. During operation of the engine 36 and engagement the PTO clutch 44, the spinning engine output shaft 82 drives rotation of the drivetrain components, which, in turn, mechanically powers rotation of the clutch shaft 64. The PTO shaft 68 corotates with the clutch shaft 64 about rotational axis 84, with the spinning output pulley wheel 76 further mechanically powering the driven crop processing device 46 through the drive belt arrangement 48. Comparatively, when the PTO clutch 44 is disengaged, the clutch shaft 64 is rotationally decoupled from the drivetrain 42 such that rotary motion is not imparted to the PTO shaft 68 and output pulley wheel 76. In this manner, the PTO clutch 44 can be engaged and disengaged, in accordance with operator commands, to selectively activate and deactivate the crop processing device 46 during operation of the cotton picker 20.

With continued reference to FIG. 1, the PTO housing extension 54 may include a peripheral mounting flange 88, which is bolted or otherwise joined to a peripheral rim region of the clutch compartment 50 and, more generally, the transmission gearbox housing 40. When so mounted and positioned in abutment against the transmission gearbox housing 40, the PTO housing extension 54 encloses the service access port 56 of the clutch compartment 50. As a corollary, manual access to the PTO clutch 44 is facilitated through the clutch service port 56 when the detachable PTO extension module 52 is removed from the transmission gearbox housing 40. The detachable PTO extension module 52 can thus be readily removed from the transmission gearbox housing 40, thereby allowing service access to the PTO clutch 44 and/or other components accessible within the clutch compartment 50 in a fraction of the time required to access such components in the case of conventional PTO clutch systems; e.g., in many instances, the time period required for PTO clutch servicing can be reduced by 75% or more. Concurrently, and as discussed more fully below, the PTO housing extension 54 may be imparted with a frusto-conical shape, a broad mounting base, and other features imparting the housing extension 54 with a relatively high structural integrity. In embodiments, PTO housing extension 54 may be mounted to the transmission gearbox housing 40 in a cantilevered manner with little, if any additional structural support provided at or adjacent the outer end portion 60 of the housing extension 54, despite loading imparted by the belt drive driven 48 to, for example, allow reductions in part count and bulk. As a still further benefit, casting or other fabrication of the PTO housing extension 54 and the transmission gearbox housing 40 may be eased relative to more complex housing designs containing fully-enclosed clutch compartments to further lower the overall manufacturing costs of the harvester PTO clutch system 22.

The foregoing has thus described the example harvester PTO clutch system 22, and benefits provided thereby, in a generalized or conceptual sense in connection with the schematic of FIG. 1. For completeness, a more detailed example implementation of the harvester PTO clutch system 22 (particularly, the transmission gearbox housing 40, the PTO clutch 44, and the detachable PTO extension module 52) will now be discussed in connection with FIGS. 2-10. In the following description, reference numerals are carried forward where appropriate to identify like structural features appearing throughout the drawing figures. As a point of emphasis, the following description provides but one example of a possible implementation of the detachable PTO extension module 52, the transmission gearbox housing 40, and components contained in the harvester PTO clutch system 22. In further implementations, the harvester PTO clutch system 22 may omit any number of structural components described below, may contain additional structural components, or may otherwise differ in various respects.

Figure 2:
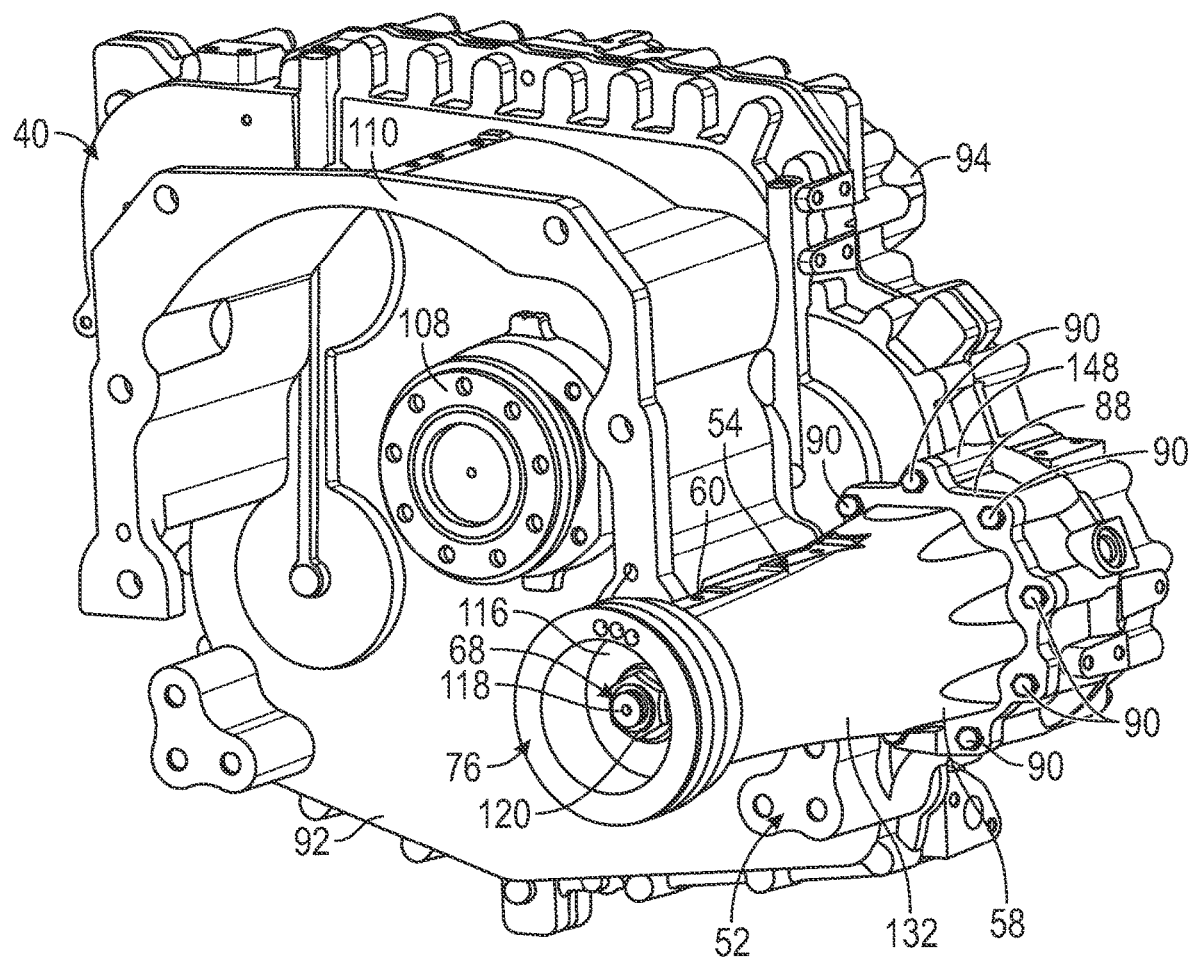
FIG. 2 is an isometric view of an example implementation of the PTO clutch system shown in FIG. 1 including, among other components, a transmission gearbox housing to which a detachable PTO extension module is removably attached.
Figure 3:
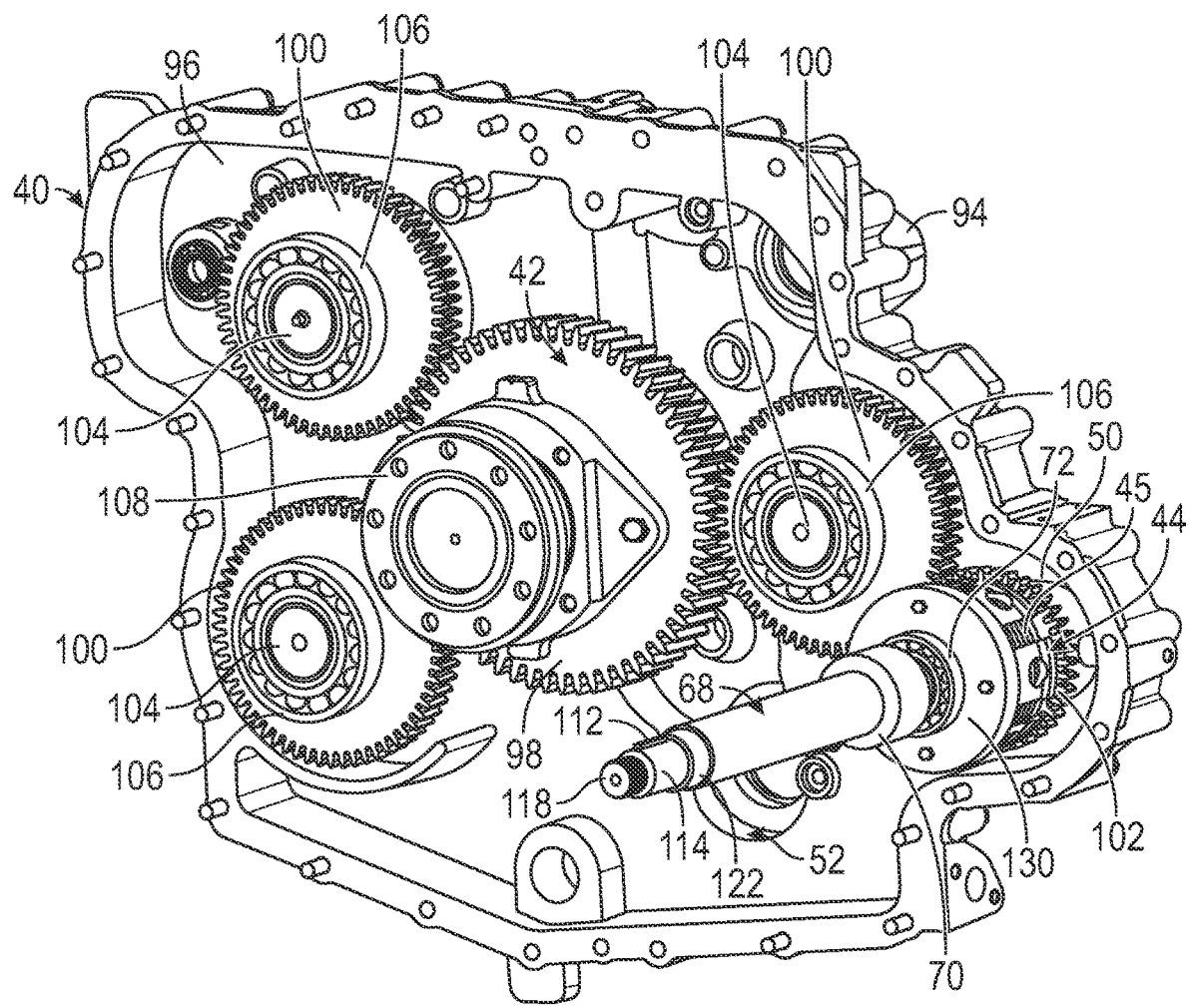
FIG. 3 is an isometric view of the PTO clutch system shown in FIG. 2 with certain components, including a cover piece of the transmission gearbox housing and a PTO housing extension of the detachable PTO extension module, hidden from view.
Figure 4:
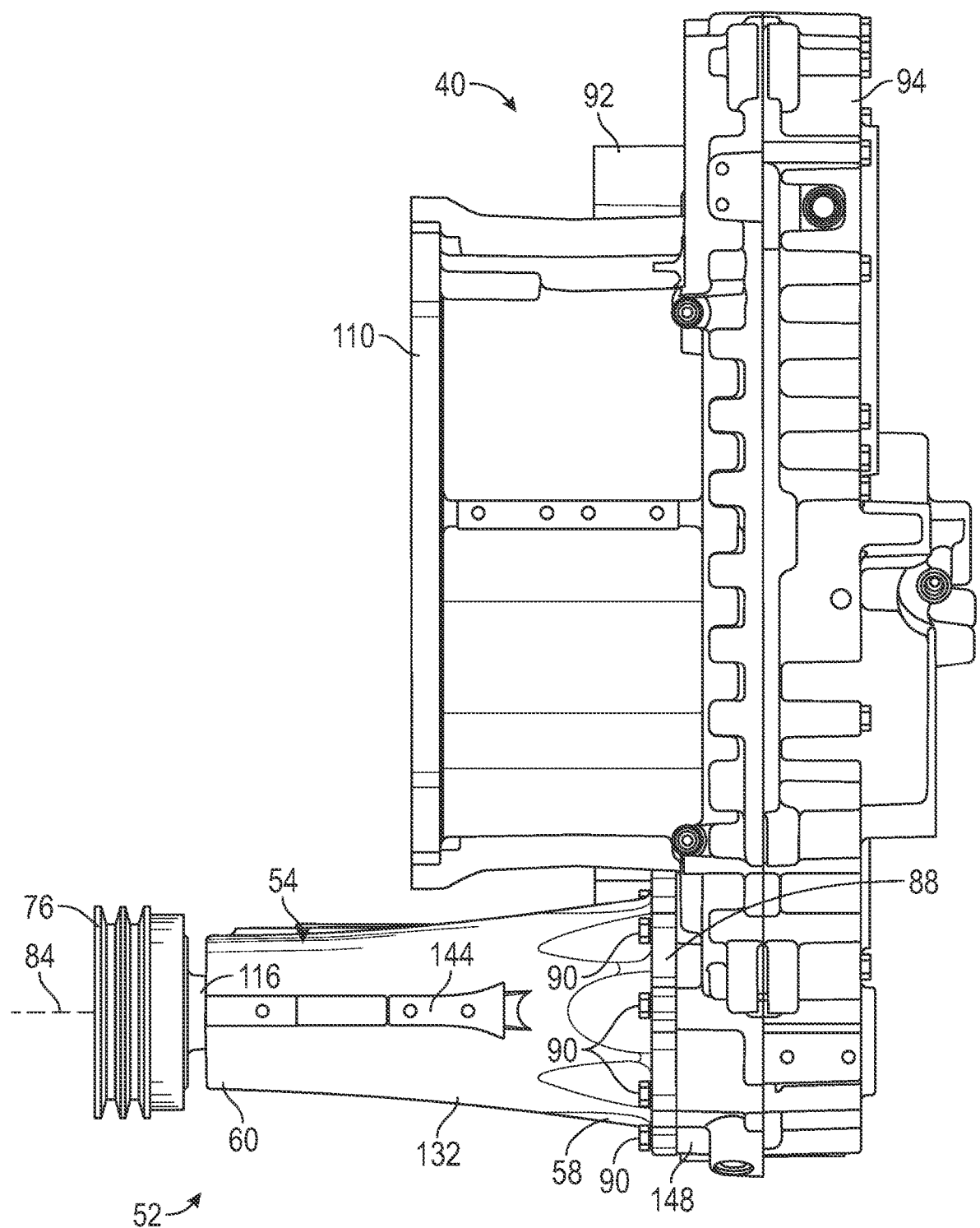
FIG. 4 is a top isometric views of the transmission gearbox housing, detachable PTO extension module, and output pulley wheel included in the PTO clutch system shown in FIGS. 2 and 3.

Advancing to FIGS. 2-4, in an example structural implementation of the harvester PTO clutch system 22, the transmission gearbox housing 40 is assembled from two primary halves or housing pieces: a housing cover piece 92 and a housing base piece 94. The housing cover piece 92 is hidden from view in FIG. 3 (along with certain other components) to reveal the main interior cavity 96 of the transmission gearbox housing 40, as well as the clutch compartment 50 provided in a right side of the gearbox housing 40. As indicated above, a drivetrain 42 is housed within the transmission gearbox housing 40; and, in the present example, includes a number of intermeshing gears 98, 100, 102 and associated shafts 104 supported by rolling element bearings 106. Specifically, the drivetrain 42 includes an input gear 98, which is rotationally joined to an engine connection flange 108 for connection to the output shaft 82 of the engine 36 (FIG. 1); and an output gear 102, which is coupled to a mechanical input of the PTO clutch 44. In embodiments, the engine 36 may be mounted transversely within the cotton picker 20, with the engine 36 mating to a protruding, shroud-like structure 110 partially surrounding the engine connection flange 108. Rotation of the engine output shaft 82 thus animates the drivetrain 42 through the input gear 98, with the various other gears 100, 102 then driving rotation of the mechanical outputs of the drivetrain 42. The particular gearing arrangement of the drivetrain 42, and the larger design of the transmission gearbox housing 40, will vary among embodiments and will not be described in detail herein.

The detachable PTO extension module 52 is mounted to the transmission gearbox housing 40 in a cantilevered manner. As previously noted, the outer terminal end of the PTO shaft 68 projects from the PTO housing extension 54 and is rotationally affixed to the pulley wheel 76 (FIG. 2) such that the PTO shaft 68 and the pulley wheel 76 corotate about the common rotational axis 84 (FIG. 1). In the illustrated example, the PTO shaft 68 includes a key 112 (FIG. 3), which engages a corresponding slot or keyway (not shown) within an inner circumference of the pulley wheel hub 116 to provide the desired rotational coupling. As shown in FIG. 3, the key 112 projects from a stepped section 114 of the PTO shaft 68, which engages the central opening provided in the hub 116 of the pulley wheel 76 in a mating or close fit relationship when the harvester PTO clutch system 22 is fully assembled. A threaded outer tip portion 118 of the PTO shaft 68 is accessible from the side of the pulley wheel 76 opposite the PTO housing extension 54. A retention nut 120 (FIG. 2) is threaded onto the outer shaft tip portion 118 to prevent sliding disengagement of the pulley wheel 76 from the PTO shaft 68 and to further exert a clamp load against the outer extension bearing 74; e.g., as discussed in connection with FIG. 8, the outer extension bearing 74 may pilot onto a stepped section 122 of the PTO shaft 68 and be pressed against an inner circumferential shelf 124 within the PTO extension module 52 by the clamp load exerted by the retention nut 120 through the hub 116 of the pulley wheel 76.

The PTO clutch 44 is best viewed in FIG. 3 and assumes the form of a multi-plate clutch pack in the illustrated example. Accordingly, the PTO clutch 44 contains a stack of clutch discs 45, a hydraulic-actuated piston (hidden from view), and one or more springs 47 (visible in FIGS. 8 and 9). In at least some instances, the PTO clutch 44 may also include an inertia ring 130 to reduce torsional vibrations generated during operation of the harvester PTO clutch system 22. The PTO clutch 44 may be configured to be normally disengaged such that the PTO clutch 44 contains the clutch spring 47 serves as a release spring, which normally maintain the clutch disc stack 45 in a non-engaged state. When adequate hydraulic pressure is applied to the piston, the piston extends to overcome the spring force and press the clutch discs together. This engages the PTO clutch 44, thereby rotationally coupling the output gear 102 to the clutch shaft 64 (FIGS. 3, 5, 8, and 9). The hydraulic pressure applied to the PTO clutch 44 may then be reduced when the PTO clutch 44 is desirably disengaged, with the spring force then causing retraction of the hydraulic piston and rotational disengagement or decoupling of the clutch disc stack 45. In alternative embodiments, the PTO clutch 44 may assume other forms movable between an engaged position in which the clutch 44 rotationally couples the clutch shaft 64 to a mechanical output of the drivetrain 42 (e.g., the output gear 102 shown in FIG. 3) and a disengaged position in which the clutch 44 rotationally decouples the clutch shaft from the drivetrain output.

Figure 5:
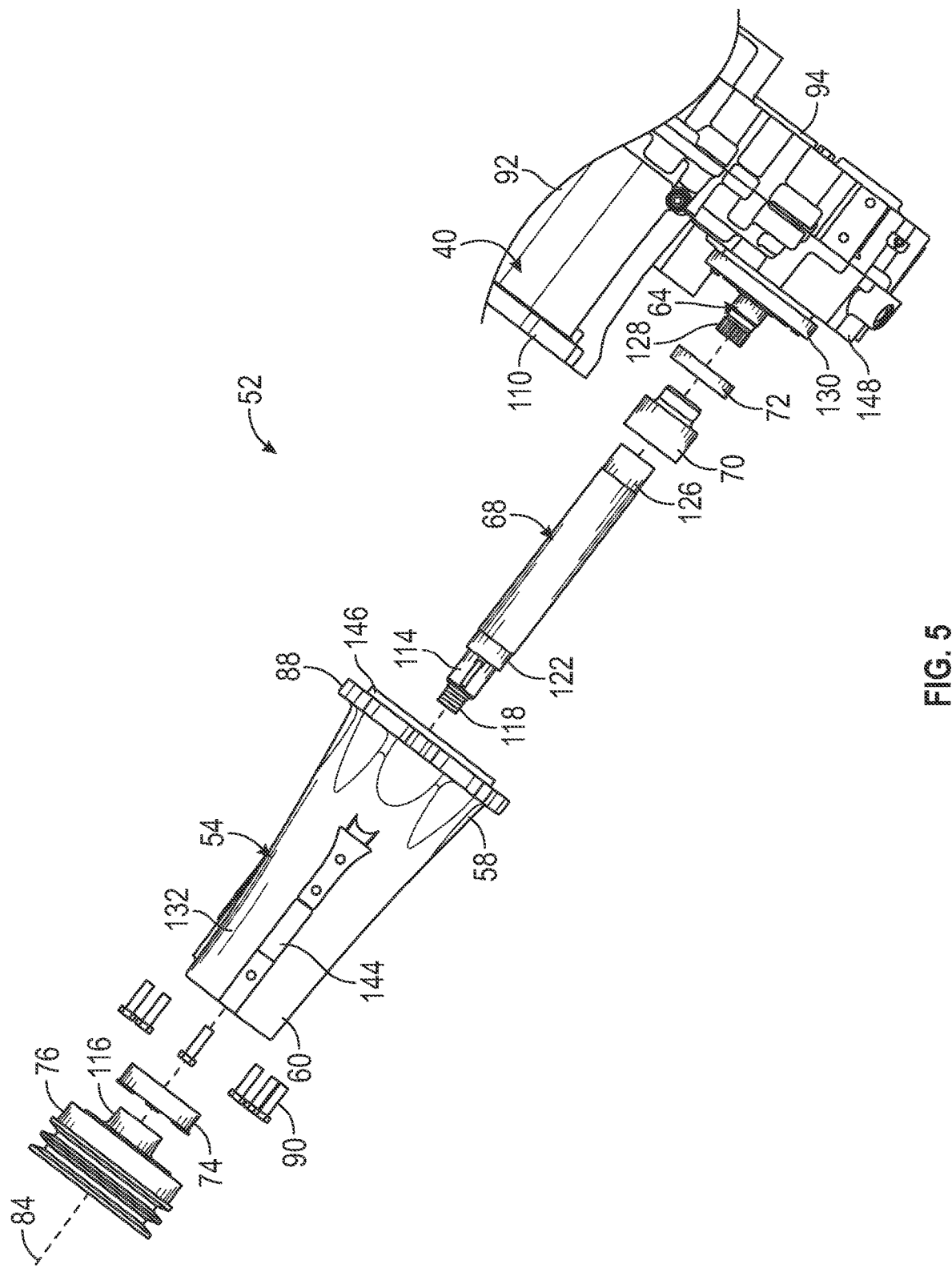
FIG. 5 is a top of the detachable PTO extension module (shown in an exploded state), the output pulley wheel, and a limited region of the transmission gearbox housing containing the clutch compartment.

Referring now to FIG. 5 in conjunction with FIGS. 2-4, inner end portion of the PTO shaft 68 further includes a stepped section 126, which matingly inserts into the coupler piece 70. In this regard, the coupler piece 70 may have a larger outer diameter (OD) end into which the stepped-down or necked-down inner end of the PTO shaft 68 inserts and is rotationally fixed; e.g., in one approach, the coupler piece 70 may be shrunk fit onto the PTO shaft 68. The opposing end of the coupler piece 70 may have a splined inner circumferential surface (visible in FIG. 8), which engages a splined outer circumferential of the outer terminal end of the clutch shaft 64. In this regard, the outer end portion of the clutch shaft 64 may project from the clutch compartment 50, through the clutch service port, and terminate in a splined tip portion or outer terminal end 128, which inserts into the splined annular end of the coupler piece 70. This creates a sliding shaft-to-shaft interface 70, 126, 128, which rotationally couples the PTO shaft 68 and the clutch shaft 64. The sliding shaft-to-shaft interface 70, 126, 128 is located between the inner and outer extension bearings 72, 74, as taken along the rotational axis 84 of the PTO shaft 68. The sliding shaft-to-shaft interface 70, 126, 128 may also be located longitudinally adjacent the inner extension bearing 72. Such a bearing positioning within the PTO housing extension generally provides rotational support of the shafts 64, 68 and the shaft-to-shaft interface 70, 126, 128. Further, and as discussed more fully below in connection with FIGS. 8 and 9, the PTO shaft 68 and the clutch shaft 64 may decouple at the sliding shaft-to-shaft interface 70, 126, 128 when the detachable PTO extension module 52 is removed from the transmission gearbox housing 40.

Figure 6:
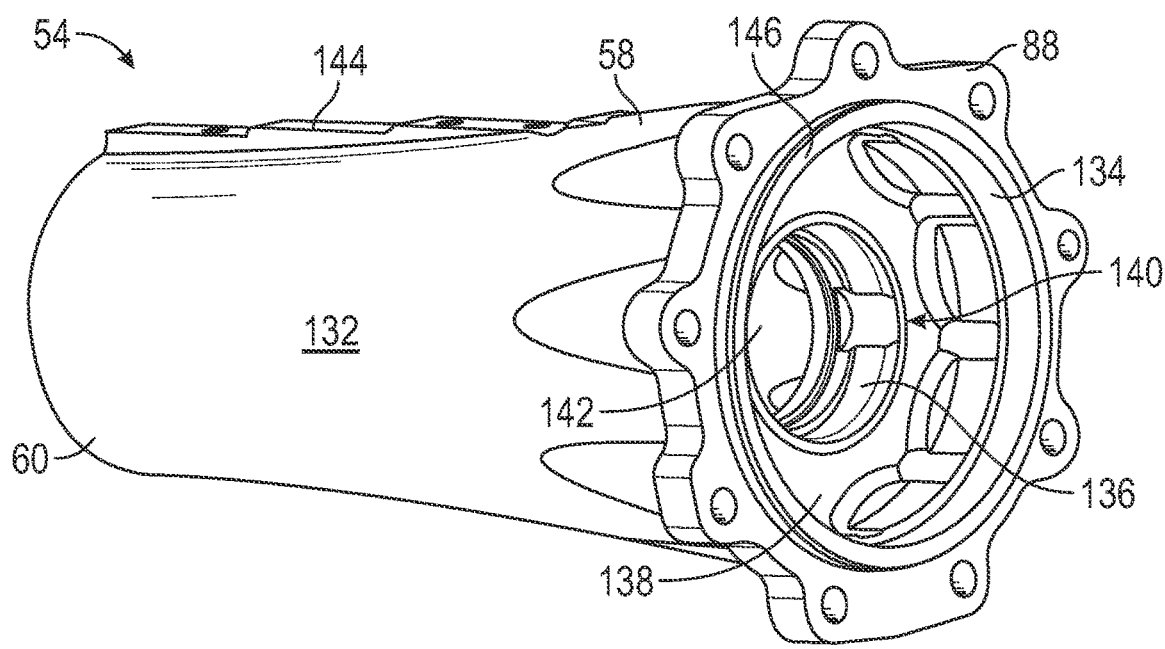
FIGS. 6 and 7 are front and rear isometric views, respectively, illustrating the PTO housing extension of the detachable PTO extension module in isolation.
Figure 7:
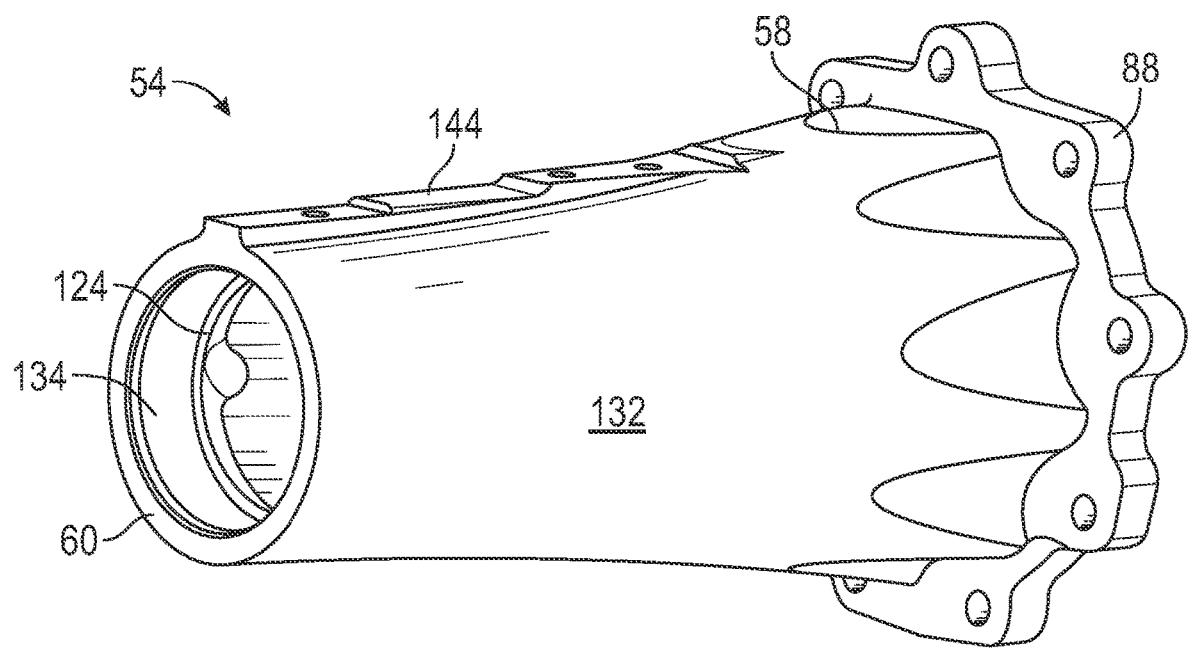
Figure 8:
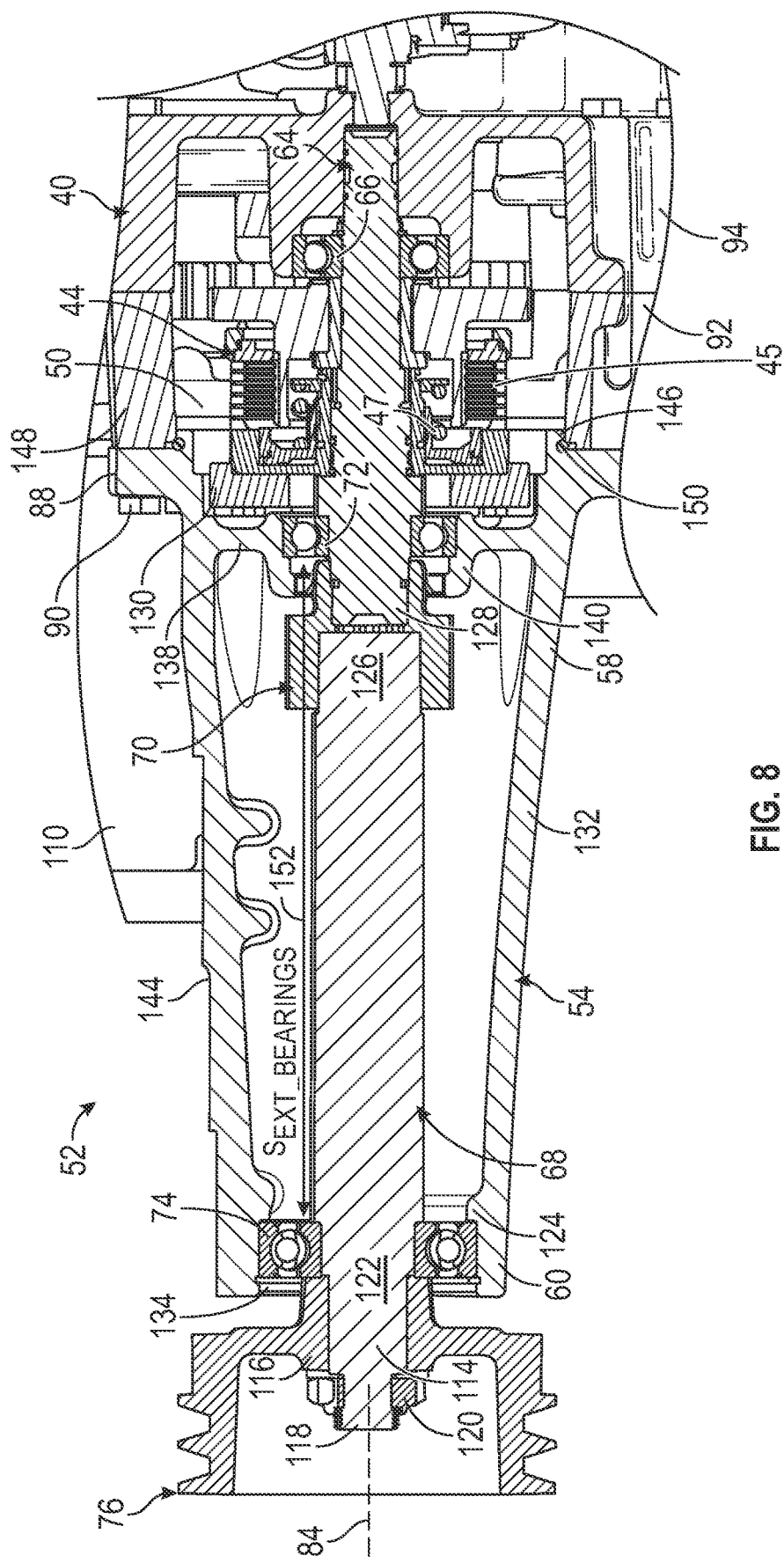
FIG. 8 is a cross-sectional view of the PTO clutch system, as taken through the detachable PTO extension module, the transmission gearbox housing (partially shown), and a PTO clutch housed within the transmission gearbox housing.

Referring now to FIGS. 6-8 in conjunction with FIGS. 1-5, the PTO housing extension 54 includes an outer conical sidewall 132; the term "outer," as appearing in this context, utilized in a radial sense relative to the centerline of the detachable PTO extension module 52 (parallel to or co-axial with the rotational axis 84 in the illustrated example). The outer conical sidewall 132 is dimensioned to taper both in inner and outer diameters when moving from the outer end portion 60 toward the inner end portion 58 of the housing extension 54 (left to right in FIGS. 6-8). In addition to the outer conical sidewall 132, the PTO housing extension 54 includes interior annular wall or "inner circumferential shelf 124," which projects inwardly from an interior surface of the outer conical sidewall 132 at a location within or adjacent the open outer end portion 60 of the PTO housing extension 54. As most clearly show on the left side of FIG. 8, the outer ring of the outer extension bearing seats or abuts against the inner circumferential shelf 124 when the outer extension bearing 74 is inserted into PTO housing extension 54 through an opening provided in the outer end portion 60 thereof. When so inserted, the outer extension bearing 74 occupies a generally cylindrical cavity 134 (FIG. 7) formed in the outer end portion 60 of the PTO housing extension 54. The outer end portion of the PTO shaft 68 extends through the cylindrical cavity 134 for connection with the pulley wheel 76 and the retention nut 120, with the inner ring of the outer extension bearing 74 piloting on the stepped section 122 of the PTO shaft 68 in the manner previously described. The hub 116 of the pulley wheel 76 contacts the inner ring of the outer extension bearing 76 to capture the extension bearing 76 in its desired position within the outer end portion 60 of the PTO housing extension 54. In this regard, the retention nut 120 is tightened onto the threaded tip portion 118 of the PTO shaft 68 to exert a clamp force on the outer extension bearing 76 through the hub 116 of the pulley wheel 76 pressing extension bearing 76 against the inner circumferential shelf 124 of the PTO housing extension 54.

A relatively large diameter, open cylindrical cavity 134 (FIG. 6) is further provided in the inner end portion 58 of the PTO housing extension 54. As best shown in FIG. 8, this cavity 134 is sized and shaped to accommodate the clutch inertia ring 130 when the detachable PTO extension module 52 is installed on the transmission gearbox housing 40. Longitudinally adjacent this cylindrical cavity 134, the PTO housing extension 54 also includes a radially-extending inner wall 138 and an annular bearing support structure 140. The radially-extending inner wall 138 extends inwardly from the outer conical sidewall 132 a location proximate or adjacent the peripheral mounting flange 88 to terminate and connect at the annular bearing support structure 140. As indicated in FIGS. 6 and 7, the outer conical sidewall 132, the radially-extending inner wall 138, the annular bearing support structure 140, and the other structural features of the PTO housing extension 54 are advantageously integrally formed (e.g., cast and machined) as a single part piece or unitary structure; however, this need not be the case in all embodiments. When the detachable PTO extension module 74 is fully assembled, the inner extension bearing 72 pilots within a smaller diameter cylindrical cavity 136 provided in the annular bearing support structure 140 (identified in FIG. 6). A central opening 142 is formed through the annular bearing support structure 140 to allow passage of the splined outer terminal end 128 of the clutch shaft 64 through the bearing support structure 140 and inner ring of the inner extension bearing 72 for connection to the adapter piece 70.

To further ensure proper positioning of the PTO housing extension 54 when installed on the transmission gearbox housing 40, the PTO housing extension 54 may be fabricated to further include an annular collar or lip 146, which is located adjacent the outer peripheral flange 88 and which extends from the PTO housing extension 54 in a direction opposite the annular bearing support structure 140. The annular lip 146 is dimensioned and shaped to register or pilot with an inner circumferential surface of the clutch compartment 50 in a close-fit relationship when the PTO housing extension 54 is mounted to the transmission gearbox housing 40. As identified in FIG. 8, an O-ring or annular seal 150 may also be positioned at the interface formed between the inner circumferential surface of the clutch compartment 50 and an outer circumferential surface of the annular lip 146. When provided, the seal 150 may prevent or minimize leakage of lubricant from the clutch compartment 50. Further, given its positioning about an outer circumference surface of the annular lip 146, the seal 150 is readily accessible for inspection and replacement during maintenance following removal PTO housing extension 54, as described below. Finally, the PTO housing extension 54 can be fabricated (e.g., cast and machined) to include various local geometries or structural features 144, mounting interfaces for smaller components (e.g., wire harnesses) and/or reinforcement ribs for better distributing localized mechanical stress or otherwise increasing the structural integrity of the PTO housing extension 54 as appropriate.

The outer peripheral flange 88 extends at least partially around an outer periphery of the inner end portion 58 of the PTO housing extension 54 for connection to the outer rim portion 148 of the transmission gearbox housing 40 bounding the clutch compartment 50. Due to the generally conical geometry of the PTO housing extension 54, the outer peripheral flange 88 may be sized to provide the PTO housing extension 54 with a relatively broad (large diameter) mounting base at the inner end portion 58 of the housing extension 54. The geometry of the PTO housing extension 54, in combination with the structural reinforcement features 155, may impart the PTO housing extension 54 with a relatively high structural integrity despite the longitudinally-elongated form factor of the housing extension 54. Due to such attributes, the PTO housing extension 54 can be mounted in a cantilevered manner such that little, if any structural support is required adjacent the middle and outer end portions of the PTO housing extension 54 despite loading of the outer end portion of the PTO shaft 68 through the pulley wheel 76 and the drive belt arrangement 48 (FIG. 1). This may enable a reduction in the overall part count of the harvester PTO clutch system 22 and/or may otherwise enable the envelope of the transmission gearbox housing 40, the PTO extension module 52, and the drive belt arrangement 48 to be made relatively compact in the case of space-constrained harvester platforms. Moreover, the PTO housing extension 54 can be readily fabricated as cast blank or preform, which is subsequently machined and otherwise processed to yield the final component. Manufacturing costs may be reduced as a result, while further the PTO housing extension 54 is imparted with a high strength, single piece construction. Additionally, the open nature of the clutch compartment 50, and the overall provision of the detachable PTO extension module 52, may help simplify the design and fabrication of the transmission gearbox housing 40 to further reduce manufacturing costs.

Embodiments of the detachable PTO extension module 52 further provide relatively continuous or complete support of those portions of the shafts 64, 68 extending into and through the PTO extension housing 54. To this end, and as briefly noted above, the PTO extension module 52 may be designed such that a relatively expansive longitudinal spacing or wide stance is provided between the inner and outer extension bearings 72, 74, as taken along the rotational axis 84 of the PTO shaft 68 and of the clutch shaft 64. This may be appreciated by referring to the double-headed arrow 152 appearing in FIG. 8, which identifies the longitudinal spacing between the inner and outer extension bearings 72, 74 (hereafter, the "extension bearing spacing 152"). As can be seen, the extension bearing spacing 152 spans the majority, if not the substantial entirety (that is, at least 80%) of the length of the PTO extension housing 54, as measured along the rotational axis 84. Further, in the illustrated example, the extension bearing spacing 152 exceeds both the length of the clutch shaft 64 and the maximum depth of the clutch compartment 50 in the illustrated example, as each further measured along the rotational axis 84. Generally, such a wide bearing stance decreases the likelihood of rotational imbalances and other problematic modes (e.g., shaft wobble) developing within the detachable PTO extension module 52 over time as, for example, the harvester 20 (FIG. 1) travels over the relatively rough terrain. Additionally, the clutch shaft 64 and the PTO shaft 68 are located between the extension bearings 72, 74, and longitudinally-adjacent the inner extension bearing 72 and the annular bearing support structure 140 within the PTO extension housing 54. The clutch shaft 64 and the PTO shaft 68 are thus well-supported at the sliding shaft-to-shaft interface 70, 126, 128 to reduce mechanical stress at this interface.

Figure 9:
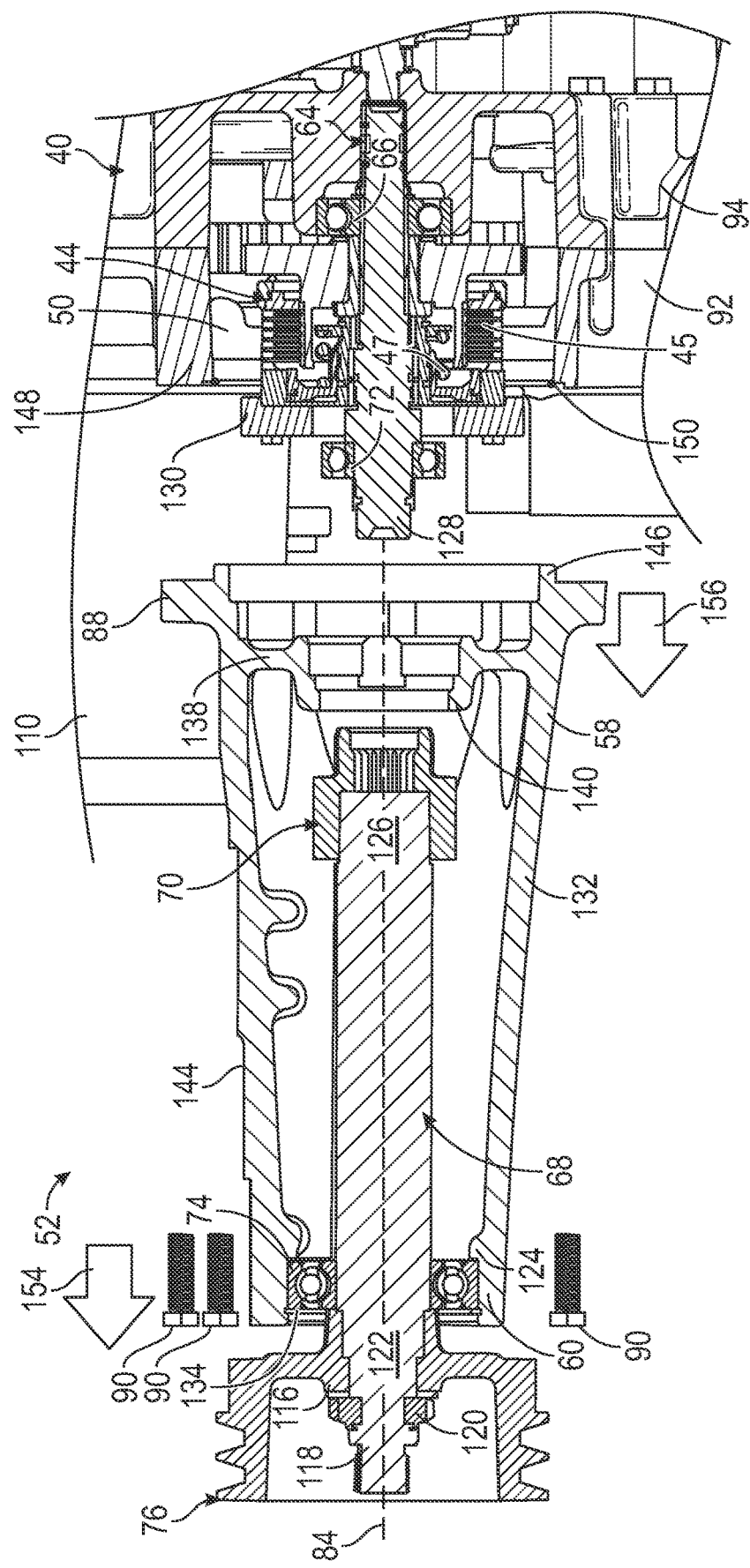
FIG. 9 is a cross-sectional view of the PTO clutch system similar to the view shown in FIG. 8, but further depicting removal of the detachable PTO extension module in a manner providing service access to the PTO clutch within the clutch compartment of the transmission gearbox housing.

By virtue of the above-described structural design, a technician or operator can remove the detachable PTO extension module 52 from the transmission gearbox housing 40 with relatively few disassembly steps to facilitate manual access to the PTO clutch 44 for inspection and servicing. In the illustrated example, and referring now to FIG. 9, the detachable PTO extension module 52 may be removed from the transmission gearbox housing 40 in the following manner. First, the drive belt 80 may be loosened and removed from the output pulley wheel 76 in the typical manner. Next, as indicated by arrow 154, the ring of bolts 90 attaching the outer peripheral flange 88 of the PTO extension housing 54 to the transmission gearbox housing 40 is removed. Finally, the PTO extension module 52 is withdrawn or detached from the transmission gearbox housing 40 by sliding (translational) movement along the rotational axis 84 in a direction opposite the clutch compartment 50, as indicated by arrow 156 (FIG. 9). Such disassembly steps can be performed in relatively quick succession noting, for example, that the bolt ring 90 is manually accessible without disassembly of the harvester PTO clutch system 22, may contain a relatively small number (e.g., under a dozen) bolts 90, and PTO extension module 52 may be sufficiently light weight to permit manual removal without the assistance of a hoist or a similar mechanism. Further, depending upon design specifics, the inner extension bearing 72 may stay contained within the annular bearing support structure 140 of the PTO extension housing 54; or, instead, may remain in place on the protruding end portion of the clutch shaft 64, as shown. In either instance, the inner extension bearing 72 is readily accessible for manual inspection, servicing, and potential replacement following removal of the detachable PTO extension module 52.

Figure 10:
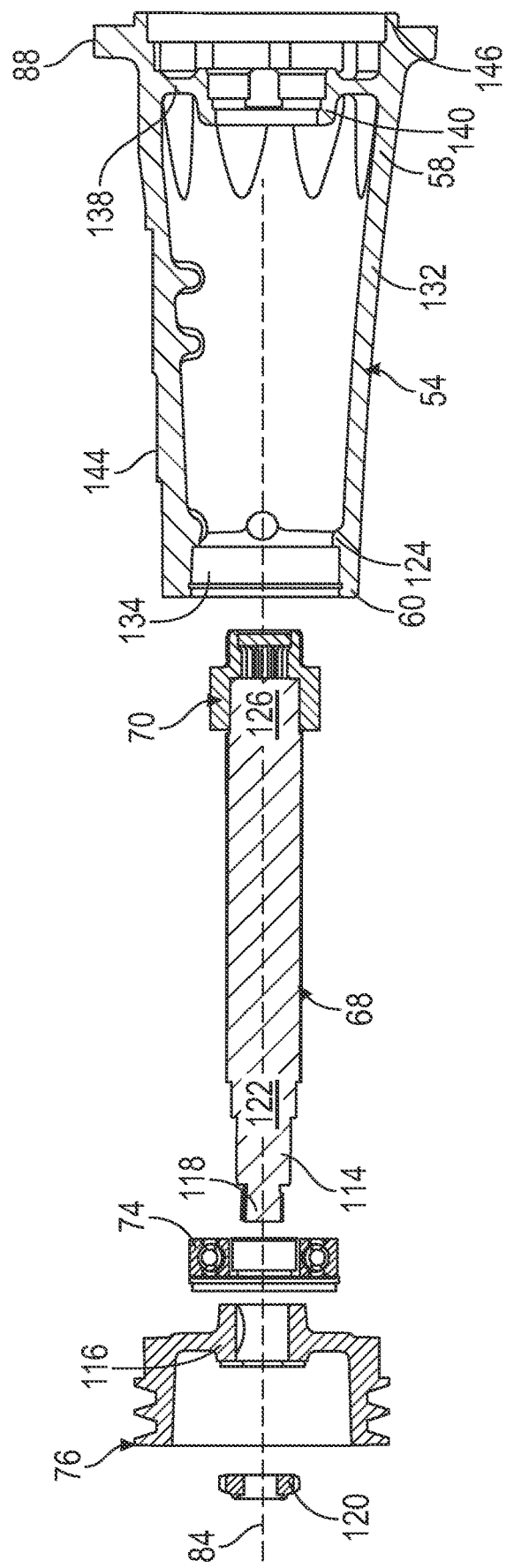
FIG. 10 is a cross-sectional view of the detachable PTO extension module in a disassembled state, with the inner extension bearing hidden from view.

Following detachment of the PTO extension module 52 from the gearbox housing assembly 40, a technician or operator can access to the PTO clutch 44 for servicing and potential replacement; noting that, in many instances, the PTO clutch 44 can be serviced without removal from the clutch compartment 50. This stated, the PTO clutch 44 can also be removed along with the clutch shaft 64 from the gearbox housing assembly 40 to gain access to the transmission gearbox bearing 66 or to otherwise thoroughly inspect the interior of the clutch compartment 50, when appropriate. Generally, then, service access to the PTO clutch 44, as well as the nearby components (e.g., the clutch shaft 64 and the transmission gearbox bearing 66) within the clutch compartment 50, is streamlined to allow clutch servicing in an abbreviated time period to reduce maintenance costs and minimize harvester downtime. Further, if desired, the detachable PTO extension module 52 itself can also be disassembled in short order for inspection and servicing of, for example, the outer extension bearing 74 or another component contained in the PTO extension module 52. In this regard, the PTO shaft 68, the coupler piece 70, and the outer extension bearing 74 can be readily withdrawn through the open outer end portion 60 of the PTO housing extension 54 after PTO extension module detachment. Referring lastly to FIG. 10 (illustrating the detachable PTO extension module 52 in a disassembled state), the outer extension bearing 74 and the pulley wheel 76 can then be removed from the PTO shaft 68, if desired, by unscrewing the retention nut 120 from the threaded tip 118 of the PTO shaft 68. In this manner, the inner and outer extension bearings 72, 74 can be readily accessed with minimal disassembly steps following removal of the detachable PTO extension module 52 from the transmission gearbox housing 40 to ease servicing during both scheduled maintenance and unplanned service events.

Enumerated Examples of the Harvester Power Takeoff Clutch System

The following examples of the harvester PTO takeoff system are further provided and numbered for ease of reference.

1. In a first example embodiment, a harvester PTO clutch system includes a detachable PTO extension module and transmission gearbox housing, which has a clutch compartment and a clutch service port through which the clutch compartment can be accessed. A PTO clutch is disposed in the clutch compartment, and a clutch shaft extends from the PTO clutch and projects from the clutch compartment through the clutch service port. The detachable PTO extension module includes, in turn: a PTO housing extension mounted to the transmission gearbox housing; a PTO shaft rotatably coupled to the PTO clutch and projecting from the PTO housing extension in a direction opposite the transmission gearbox housing; an inner extension bearing disposed in the PTO housing extension and rotatably supporting the clutch shaft; and an outer extension bearing further disposed in the PTO housing extension and rotatably supporting the PTO shaft. The clutch service port is at least partly uncovered when the detachable PTO extension module is removed from the transmission gearbox housing to facilitate manual access to the PTO clutch.

2. The harvester PTO clutch system of example 1, wherein the PTO housing extension includes an inner end portion and an outer end portion located opposite the inner end portion, as taken along a rotational axis of the PTO shaft. The inner end portion of the PTO housing extension mounted to the transmission gearbox housing at a location enclosing the clutch service port.

3. The harvester PTO clutch system of example 2, wherein the PTO shaft projects through an opening provided in the outer end portion of the PTO housing extension, while the clutch shaft is received through an opening provided in the inner end portion of the transmission gearbox for rotational coupling to the PTO shaft.

4. The harvester PTO clutch system of example 2, wherein the PTO housing extension includes a conical sidewall that tapers downwardly in inner and outer diameters when moving from the inner end portion toward the outer end portion of the PTO housing extension.

5. The harvester PTO clutch system of example 2, wherein the inner extension bearing is inserted into the PTO housing extension through the inner end portion thereof. Comparatively, the outer extension bearing is inserted into the PTO housing extension through the outer end portion thereof.

6. The harvester PTO clutch system of example 2, further including a peripheral flange formed about an outer periphery of the inner end portion and attached to transmission gearbox housing at a mount interface circumscribing the clutch service port.

7. The harvester PTO clutch system of example 6, further including an annular lip extending from the PTO housing extension and received into the clutch compartment to position the PTO housing extension relative to the transmission gearbox housing.

8. The harvester PTO clutch system of example 1, wherein the inner extension bearing and the outer extension bearing are spaced by a distance exceeding the length of the clutch shaft, as taken along a rotational axis of the PTO shaft.

9. The harvester PTO clutch system of example 1, wherein the PTO shaft is rotatably coupled to the clutch shaft at a sliding shaft-to-shaft interface located in the PTO housing extension.

10. The harvester PTO clutch system of example 9, wherein the sliding shaft-to-shaft interface is located between the inner extension bearing and the outer extension bearing, as taken along a rotational axis of the PTO shaft.

11. The harvester PTO clutch system of example 9, wherein the PTO shaft and the clutch shaft decouple at the sliding shaft-to-shaft interface when the detachable PTO extension module is removed from the transmission gearbox housing.

12. The harvester PTO clutch system of example 1, wherein the PTO housing extension further includes a generally conical sidewall, an annular bearing support structure in which the inner extension bearing pilots, and a radially-extending inner wall extending inwardly from the generally conical sidewall to connect to the annular bearing support structure.

13. The harvester PTO clutch system of example 1, further including a pulley wheel adjacent the outer end portion of the PTO housing extension and coupled to an outer end portion of the PTO shaft in a rotationally-fixed relationship.

14. The harvester PTO clutch system of example 13, further including a mechanically-driven crop processing device and a drive belt. The belt drive mechanically couples the pulley wheel to the mechanically-driven crop processing device such that rotation of the clutch shaft powers the mechanically-driven crop processing device through the drive belt and through the PTO shaft when the PTO clutch is engaged.

15. The harvester PTO clutch system of example 14, wherein the harvester PTO clutch system is deployed onboard a cotton harvester, while the mechanically-driven crop processing device assumes the form of a cotton fan.

CONCLUSION

There has thus been provided harvester PTO clutch systems well-suited for usage onboard cotton harvesters (strippers and pickers), as well as other agricultural harvest vehicles. Embodiments of the harvester PTO clutch system include a detachable PTO extension module, which is mounted to a transmission gearbox housing in a manner enclosing a clutch compartment in which a PTO clutch is disposed. Through removal of the detachable PTO extension module, service access to the PTO clutch within the clutch compartment, as well other structural components, can be achieved in a streamlined manner to reduce service duration and harvester downtime. Embodiments of the harvester PTO clutch system also feature relatively compact designs and are amenable to cost effective manufacture due to, for example, the ability to readily fabricate (e.g., cast and machine) a PTO extension housing included in the detachable PTO extension module. Embodiment of the detachable PTO clutch system further provide relatively wide stance bearing support of the clutch shaft and the PTO shaft within the PTO extension module to reduce the susceptibility of the PTO clutch system to the development of disturbance modes (e.g., shaft wobble) over time.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the singular forms "a", "an," and "the" are intentionally-grown to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A harvester power takeoff (PTO) clutch system, comprising:
   a transmission gearbox housing having a clutch compartment and a clutch service port through which the clutch compartment can be accessed;
   a PTO clutch disposed in the clutch compartment;
   a clutch shaft extending from the PTO clutch and projecting from the clutch compartment through the clutch service port; and
   a detachable PTO extension module, comprising:
      a PTO housing extension mounted to the transmission gearbox housing;
      a PTO shaft rotatably coupled to the PTO clutch and projecting from the PTO housing extension in a direction opposite the transmission gearbox housing;
      an inner extension bearing disposed in the PTO housing extension and rotatably supporting the clutch shaft; and
      an outer extension bearing further disposed in the PTO housing extension and rotatably supporting the PTO shaft;
   wherein the clutch service port is at least partly uncovered when the detachable PTO extension module is removed from the transmission gearbox housing to facilitate manual access to the PTO clutch.

2. The harvester PTO clutch system of claim 1, wherein the PTO housing extension comprises:
   an inner end portion mounted to the transmission gearbox housing at a location enclosing the clutch service port; and
   an outer end portion located opposite the inner end portion, as taken along a rotational axis of the PTO shaft.

3. The harvester PTO clutch system of claim 2, wherein the PTO shaft projects through an opening provided in the outer end portion of the PTO housing extension; and
   wherein the clutch shaft is received through an opening provided in the inner end portion of the transmission gearbox for rotational coupling to the PTO shaft.

4. The harvester PTO clutch system of claim 2, wherein the PTO housing extension comprises a conical sidewall that tapers downwardly in inner and outer diameters when moving from the inner end portion toward the outer end portion of the PTO housing extension.

5. The harvester PTO clutch system of claim 2, wherein the inner extension bearing is inserted into the PTO housing extension through the inner end portion thereof; and
   wherein the outer extension bearing is inserted into the PTO housing extension through the outer end portion thereof.

6. The harvester PTO clutch system of claim 2, further comprising a peripheral flange formed about an outer periphery of the inner end portion and attached to transmission gearbox housing at a mount interface circumscribing the clutch service port.

7. The harvester PTO clutch system of claim 6, further comprising an annular lip extending from the PTO housing extension and received into the clutch compartment to position the PTO housing extension relative to the transmission gearbox housing.

8. The harvester PTO clutch system of claim 1, wherein the clutch shaft has a shaft length; and
   wherein the inner extension bearing and the outer extension bearing are spaced by a distance exceeding the shaft length of the clutch shaft, as taken along a rotational axis of the PTO shaft.

9. The harvester PTO clutch system of claim 1, wherein the PTO shaft is rotatably coupled to the clutch shaft at a sliding shaft-to-shaft interface located in the PTO housing extension.

10. The harvester PTO clutch system of claim 9, wherein the sliding shaft-to-shaft interface is located between the inner extension bearing and the outer extension bearing, as taken along a rotational axis of the PTO shaft.

11. The harvester PTO clutch system of claim 9, wherein the PTO shaft and the clutch shaft decouple at the sliding shaft-to-shaft interface when the detachable PTO extension module is removed from the transmission gearbox housing.

12. The harvester PTO clutch system of claim 1, wherein the PTO housing extension further comprises:
   a generally conical sidewall;
   an annular bearing support structure in which the inner extension bearing pilots; and
   a radially-extending inner wall extending inwardly from the generally conical sidewall to connect to the annular bearing support structure.

13. The harvester PTO clutch system of claim 2, further comprising a pulley wheel adjacent the outer end portion of the PTO housing extension and coupled to an outer end portion of the PTO shaft in a rotationally-fixed relationship.

14. The harvester PTO clutch system of claim 13, further comprising:
   a mechanically-driven crop processing device; and
   a drive belt mechanically coupling the pulley wheel to the mechanically-driven crop processing device such that rotation of the clutch shaft powers the mechanically-driven crop processing device through the drive belt and through the PTO shaft when the PTO clutch is engaged.

15. The harvester PTO clutch system of claim 14, wherein the harvester PTO clutch system is deployed onboard a cotton harvester; and
   wherein mechanically-driven crop processing device comprises a cotton fan.

16. A harvester power takeoff (PTO) clutch system onboard a cotton harvester having a cotton fan and a drive belt, the harvester PTO clutch system comprising:
   a transmission gearbox housing containing a clutch compartment;
   a PTO clutch disposed within the clutch compartment and accessible through a clutch service port formed through a wall of the transmission gearbox housing;

a PTO housing extension mounted to the transmission gearbox housing and covering the clutch service port to enclose the clutch compartment;
a clutch shaft extending from the PTO clutch and into the PTO housing extension;
a PTO shaft, comprising:
an outer end portion projecting from the PTO housing extension in a direction opposite the clutch compartment; and
an inner end portion terminating within the PTO housing extension and joined to the clutch shaft in a rotationally-fixed relationship; and
a pulley wheel mounted to the outer end portion of the PTO shaft for corotation with the PTO shaft and with the clutch shaft to drive the cotton fan through the drive belt when the PTO clutch is engaged.

17. The harvester PTO clutch system of claim 16, wherein the cotton harvester contains an engine having an output shaft rotatable about an output shaft rotational axis; and
wherein the PTO shaft is rotatable about a rotational axis extending substantially parallel to the output shaft rotational axis.

18. The harvester PTO clutch system of claim 16, further comprising:
an outer extension bearing disposed in the PTO housing extension and rotatably supporting the outer end portion of the PTO shaft; and
an inner extension bearing disposed in the PTO housing extension and rotatably supporting an outer end portion of the clutch shaft.

19. The harvester PTO clutch system of claim 18, wherein the outer extension bearing is spaced from the inner extension bearing by a distance exceeding a maximum depth of the clutch compartment as taken along a rotational axis of the PTO shaft.

20. The harvester PTO clutch system of claim 18, further comprising a splined interface joining the clutch shaft to the PTO shaft in a rotationally-fixed relationship, while allowing sliding decoupling of the PTO shaft from the clutch shaft;
wherein the splined interface is located between the outer extension bearing and the inner extension bearing, as taken along a rotational axis of the PTO shaft.

* * * * *